United States Patent [19]

Pradervand

[11] 3,837,656

[45] Sept. 24, 1974

[54] CHIP REMOVAL IN THE MASTERING OF FINE-GROOVED DISCS

[75] Inventor: Michel Pradervand, Chene-Bougeries, Geneva, Switzerland

[73] Assignee: RCA Corporation, New York, N.Y.

[22] Filed: Mar. 12, 1973

[21] Appl. No.: 340,606

[30] Foreign Application Priority Data

Apr. 19, 1972 Great Britain .................... 18153/72

[52] U.S. Cl. ........... 274/46 B, 274/47, 179/100.4 C

[51] Int. Cl. ............................................ G11b 3/58

[58] Field of Search .................. 274/47, 46 R, 46 B; 179/100.4 C

[56] References Cited

UNITED STATES PATENTS

| | | | |
|---|---|---|---|
| 2,746,130 | 5/1956 | Davis | 274/46 R |

FOREIGN PATENTS OR APPLICATIONS

| | | | |
|---|---|---|---|
| 569,245 | 12/1947 | Great Britain | 274/46 R |
| 1,101,512 | 1/1968 | Great Britain | 274/46 B |
| 1,522,989 | 10/1969 | Germany | 274/46 B |

*Primary Examiner*—Louis R. Prince
*Assistant Examiner*—Charles E. Phillips
*Attorney, Agent, or Firm*—Eugene M. Whitacre

[57] ABSTRACT

A system for removing chips cut away from a video disc master utilizes a stream of tempered air to direct the chips towards a vacuum orifice which in turn carries these chips off the disc.

9 Claims, 3 Drawing Figures

CHIP REMOVAL IN THE MASTERING OF FINE-GROOVED DISCS

BACKGROUND OF THE INVENTION

This invention pertains to forming information-storing, fine-grooved discs such as video discs, and more particularly, to removal of material cut away from the disc master during the process of forming a spiral groove and/or signal-information-representative topography therein.

A typical system for recording and playing back of video information has been described by Jon K. Clemens in copending application Ser. No. 126,772 filed Mar. 22, 1971, which is assigned to the same assignee as the present invention. According to this system, an aluminum disc is first coated with a lacquer and a spiral groove is cut therein with a heated cutting stylus. The grooved lacquer surface is thereafter replicated by producing negative and then positive reproductions thereof by a series of nickel deposition steps. A coating of, for example, photoresist material is then applied to the positive replicated nickel. Video information is then recorded by selectively exposing the photoresist in the spiral groove to a video-signal-modulated electron beam produced by a scanning electron microscope. After exposure and development of the photoresist, the video information appears on the bottom and wall regions of the spiral groove in the form of geometric or topographical variations. This disc is then replicated by metal plating and the plated replica thereafter is used to stamp or emboss vinyl discs by methods known in the audio recording art. The vinyl replica is then metalized to form a conducting surface, which, in turn, is coated with a dielectric material. In playing back the recorded information, a stylus is caused to ride in the dielectric-coated groove. This stylus, along with the metalization and dielectric, acts as a capacitor. Capacitance variations in the groove, which correspond to the recorded video information, are then detected electronically to recover the video information.

If, in the above-described system, video information is recorded in the lacquer-coated disc concurrently with the formation of the spiral groove by, for example, a method similar to that used in the audio recording art for recording audio record masters, then it becomes extremely important to insure removal of all chip material separated from the disc during the cutting process. Chips or debris on the record surface cause perturbations of the cutting stylus when it contacts this debris. Such pertubations have a detrimental effect on the quality of information recorded on the embossed or pressed playback disc and exhibit undesirable effects on the image produced on the playback monitor or television screen.

In the audio recording art a relatively coarse spiral groove is formed wherein the audio information is recorded. During the cutting process of this spiral groove, a coarse thread is cut from the lacquer-coated disc and this coarseness facilitates its collection and removal. A video disc, however, has a substantially high groove density of typically 4000 grooves per inch. When the spiral groove and topography are cut in this disc, an extremely fine thread or chip is formed. This fine thread is subject to frequent breakage, inhibiting removal of this material by conventional methods. If an air stream is directed at the cutting stylus in an effort to push the cut material or lacquer chips off the disc, it has been found that the amount of air necessary to effect chip or thread removal itself causes an undesirable pertubation of the cutting stylus, effectively adding a noise modulation which subsequently appears as a recorded signal on the lacquer disc. A further detrimental effect of such an air stream is that the air passing by the cutting stylus tip tends to cool the heated stylus at its cutting point. Adding further heat to the heated portion of the stylus in order to bring the tip temperature to its proper level generally causes the temperature at the upper portion of the stylus to exceed the melting temperature of the lacquer material. Chip material cut away from the lacquer disc that comes in contact with the upper portion of the stylus melts thereon detrimentally affecting the cutting stylus.

SUMMARY OF THE INVENTION

Apparatus for providing effective chip removal during the mechanical recording of a fine-groove disc utilizes a turntable adapted for rotating an information storing disc and a cutting means for forming a spiral depression and information-representative topography in the disc. A fluid outlet situated adjacent to the cutting means provides a continuous stream of heated fluid which impinges upon both the disc and cutting means at the point of contact. A collecting means is disposed adjacent the cutting means and is associated with the fluid outlet for purposes of accumulating and removing portions of the disc material removed by the cutting means.

A better understanding of this invention may be derived from the following detailed description and the accompanying figures, of which:

Figure 1:
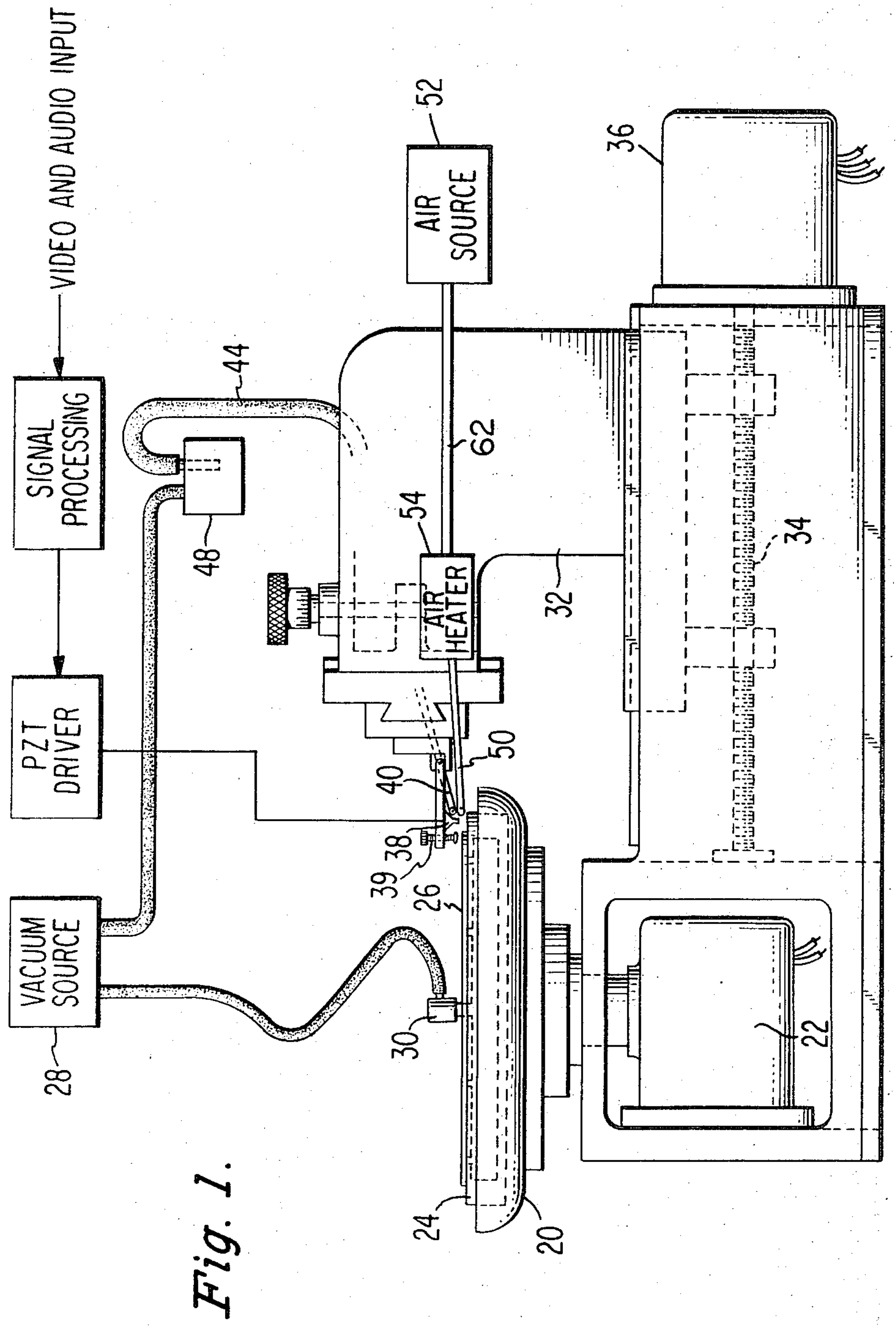
FIG. 1 is a diagrammatic representation of a disc cutting lathe embodying the present invention.

In FIG. 1, a turntable 20 is rotated at a substantially constant velocity of, for example, 15 rpm by a synchronous motor 22. A vacuum pad 24 is interposed between a lacquer-coated disc 26 and turntable 20, and operates to retain disc 26 on turntable 20. Vacuum is supplied to pad 24 by vacuum source 28 through spindle 30.

A movable support member 32 is coupled to a lead screw 34 which is driven by a synchronous motor 36. This movable support member 32 has affixed thereto a piezoelectric cutting stylus 38 and an advance ball 39 for setting the depth to which stylus 38 may cut. This cutting stylus 38 may be adjusted to impinge upon disc 26 and may be operated to linearly traverse a radius of disc 26 as a function of the velcity of motor 36.

Figure 2:
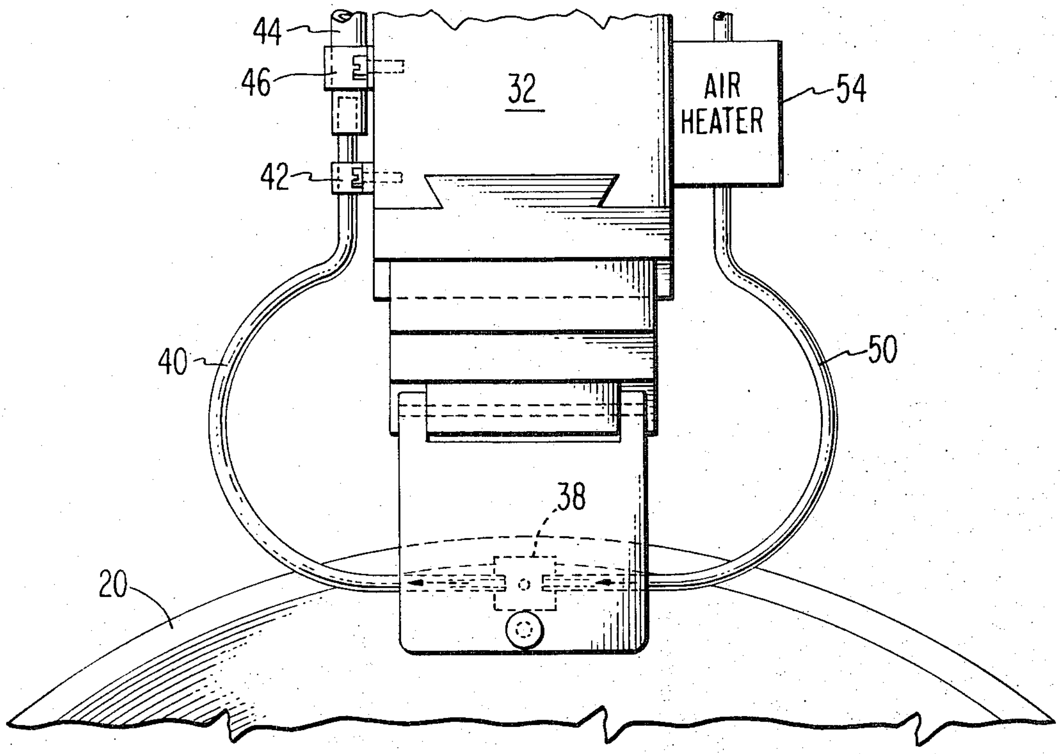
FIG. 2 is a diagrammatic representation of a portion of the embodiment shown in FIG. 1 and illustrates a position of the air and vacuum pipes in accordance with the present invention.

A curved pipe 40 of about 0.125 inch outside diameter and about 0.093 inch inside diameter is positioned adjacent to cutting stylus 38 and is fixedly mounted by a clamp 42 to movable support member 32 (see FIG. 2). The end of pipe 40 adjacent stylus 38 is flattened to an elliptical shape, although illustrated for convenience by a circle, such that the height of pipe 40 at this end is approximately 0.063 inch. The portion of pipe 40 that is mounted to movable support member 32 is inserted in a second pipe 44 having an inside diameter of about five-sixteenths inch and pipe 40 is adjusted to extend about one-half inch into pipe 44. Pipe 44 is mounted to movable support member 32 by a clamp 46 and is coupled to a chip collecting container 48 which, in turn, is coupled to vacuum source 28 (see FIG. 1). Vacuum source 28 supplies a vacuum of the order of magntiude of a pressure of about 30 inches of water and provides a sufficient vacuum for collection of chips removed from disc 26 during the spiral groove and topographic cutting process. Vacuum at stylus 38 may be adjusted by adjusting the length of insertion of pipe 40 into pipe 44.

A pipe 50 is fastened to movable support member 32 and is coupled to a source of air 52. The open end of pipe 50 is located adjacent stylus 38, but opposite the open end of pipe 40. Pipe 50 is similar in shape to the aforementioned pipe 40 and is made of the same material and has substantially the same dimensions as pipe 40 including a flattened end at the portion of the pipe adjacent stylus 38. An air heater 54 is interposed in the air line between air source 52 and pipe 50. A detailed description of air heater 54 follows with reference to FIG. 3.

FIG. 2 illustrates the location of pipes 40 and 50 with respect to cutting stylus 38. Pipes 40 and 50 have been arranged in line with stylus 38 to provide the maximum probability of chip material collection in pipe 40.

Figure 3:
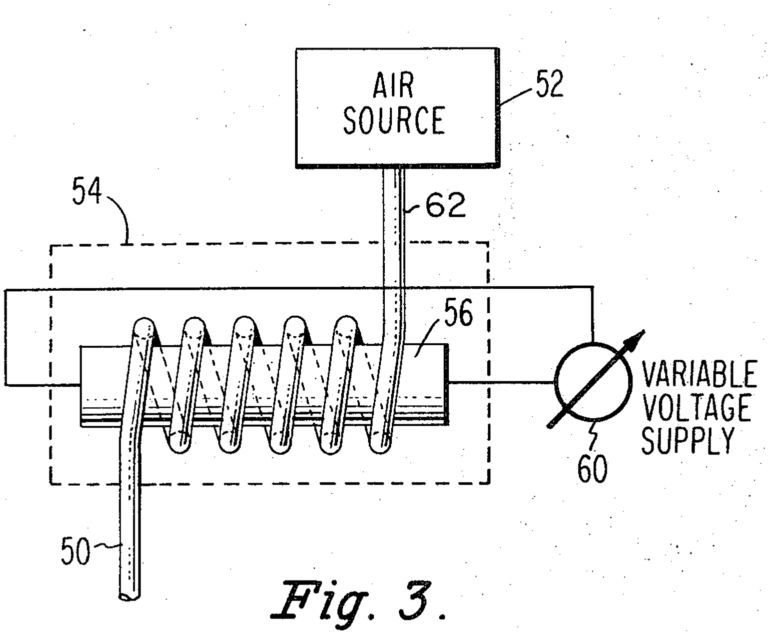
FIG. 3 illustrates apparatus for tempering the air supply utilized for removing chips in accordance with the present invention.

FIG. 3 illustrates in detail an arrangement for air heater 54. A resistor 56 of about 20 watt capacity is coupled to a variable voltage supply 60. Cooper piping 62 coupled to air source 52 and pipe 50 is closely wrapped about resistor 56 for providing heat transfer from the resistor 56 to the copper piping.

In the formation of the video disc, master disc 26 is rotated by motor 22 at, for example, about 15 rpm. Advance ball 39 is adjusted to cause cutter 38 to impinge upon disc 26 to a depth of about 0.8 microns. Motor 36 rotates lead screw 34 driving movable member 32 towards the center of disc 26 causing thereby a spiral groove to be cut in the surface of disc 26. During this cutting process, chips and filamentary portions of lacquer removed from the groove region are cast upon the surface of the rotating disc. A stream of tempered air is projected from pipe 50 past cutter 38 and towards the adjacent vacuum pipe 40. Air is supplied to pipe 50 through air heater 54 at a rate of about 5 cubic feet per hour. Air heater 54 tempers the air to about 120° C to prevent cooling of the heated cutting stylus 38. Vacuum pipe 40 acts to collect the chips and filamentary debris cut from disc 26 and draws this debris into a collecting jar 48 where the chip material is inhibited from entering vacuum 28. Hence, a low pressure air source may be used in combination with a vacuum system to effectively collect chips removed in the disc cutting process without creating detrimental effects such as induced noise by the rushing air stream or undesirable cooling of the heated cutting stylus.

What is claimed is:

1. Apparatus for cutting a groove in an information-storing disc comprising:

a turntable adapted for rotationally carrying an information-storing disc;

means for cutting a spiral depression in the disc;

a fluid outlet adjacent said cutting means;

means for supplying fluid via said outlet to impinge upon the disc and cutting means at the contact area thereof;

a first heating means coupled to said means for supplying fluid for heating said fluid;

a second heating means coupled to said cutting means for elevating the temperature of said cutting means in accordance with the melting temperature of the material in which said spiral groove is cut; and collecting means disposed adjacent said cutting means aligned with said outlet and adapted for accumulating and removing portions of the disc material removed by said cutting means and directed by said fluid towards said collecting means.

2. Apparatus according to claim 1 wherein:

said means for cutting a spiral depression includes a stylus arranged in accordance with said turntable for traversing a radial of said turntable at a predetermined speed with respect to turntable velocity.

3. Apparatus according to claim 1 wherein:

said means for supplying fluid includes a source of air coupled to said fluid outlet for directing said portions of said disc material removed by said cutting means towards said collecting means.

4. Apparatus according to claim 3 wherein:

said first heating means is adjusted to elevate the temperature of air supplied by said means for supplying fluid to be greater than the ambient air and less than the temperature required to melt said disc material.

5. Apparatus according to claim 4 wherein:

said fluid outlet adjacent said cutting means has an elliptical cross-sectional shape.

6. Apparatus according to claim 1 wherein: said collecting means includes a vacuum source coupled to a fluid inlet; and a chip collecting container interposed between said vacuum source and said fluid inlet for receiving and accumulating portions of said disc material removed by said cutting means.

7. Apparatus according to claim 6 wherein:

said collecting means disposed adjacent said cutting means has a fluid inlet having an elliptical cross-sectional shape.

8. Apparatus according to claim 7 wherein:

vacuum adjusting means is coupled between said fluid inlet and said vacuum source.

9. Apparatus according to claim 8 wherein:

said vacuum adjusting means comprises a first vacuum carrying conduit coupled to said vacuum source;

a second vacuum conduit coupled to said fluid inlet, said second conduit having an outside diameter of said first conduit; and said first conduit adapted for receiving a predetermined length of said second conduit for adjusting the vacuum at said fluid inlet.

* * * * *